(12) United States Patent
Green et al.

(10) Patent No.: US 12,103,575 B2
(45) Date of Patent: Oct. 1, 2024

(54) WHEEL STORAGE APPARATUS AND KIT

(71) Applicant: Canadian Tire Corporation, Limited, Toronto (CA)

(72) Inventors: David Green, Toronto (CA); John Paul Schmider, Scarborough (CA); Timothy James Sommerfeld, Ariss (CA); Edmond Mok, Scarborough (CA); Patrick Tallon, Toronto (CA); Abdul Haleem Ahamed Koya, Oakville (CA)

(73) Assignee: CANADIAN TIRE CORPORATION, LIMITED, Toronto (CA)

( * ) Notice: Subject to any disclaimer, the term of this patent is extended or adjusted under 35 U.S.C. 154(b) by 266 days.

(21) Appl. No.: 17/661,790

(22) Filed: May 3, 2022

(65) Prior Publication Data
US 2022/0371639 A1 Nov. 24, 2022

(30) Foreign Application Priority Data

May 21, 2021 (CA) ................................ CA 3119375

(51) Int. Cl.
*B62B 1/26* (2006.01)
*A47F 7/04* (2006.01)
(Continued)

(52) U.S. Cl.
CPC ................ *B62B 1/264* (2013.01); *A47F 7/04* (2013.01); *B60B 30/10* (2013.01); *B62B 1/12* (2013.01);
(Continued)

(58) Field of Classification Search
CPC ..... B62B 1/264; B62B 1/12; B62B 2202/031; B62B 2206/02; A47F 7/04; B60B 30/10
See application file for complete search history.

(56) References Cited

U.S. PATENT DOCUMENTS

| 374,161 | A | * | 11/1887 | Wren | ......................... | B62B 1/10 |
| | | | | | | 280/47.27 |
| 528,747 | A | * | 11/1894 | Thomas | .................... | B62B 1/10 |
| | | | | | | 188/23 |

(Continued)

FOREIGN PATENT DOCUMENTS

| AT | 12176 U1 * | 10/2011 | ............. B60B 30/00 |
| CA | 38183 S | 10/1974 | |

(Continued)

OTHER PUBLICATIONS

Mastercraft P-Handle Hand Truck, 600-lb., Canadian Tire, (7 pages), [Retrieved from the Internet Oct. 21, 2022] <URL: https://www.canadiantire.ca/en/pdp/mastercraft-p-handle-hand-truck-600-lb-0600512p.html>.

(Continued)

*Primary Examiner* — Jacob B Meyer
(74) *Attorney, Agent, or Firm* — Alston & Bird LLP

(57) ABSTRACT

According to some embodiments, there is provided a wheel storage apparatus comprising a frame having a loading platform, a wheel supporting platform and a handle section. When the wheel storage apparatus is in a first orientation, the loading platform is generally parallel with and at a loading height from a loading surface and configured to cradle a plurality of wheels about a circumferential portion of each wheel. The wheel supporting platform is coupled to a first end of the loading platform and configured to support the wheels in a stacked configuration when the wheel storage apparatus is in a second orientation. The wheel storage apparatus is configured to rotate from the first orientation to the storage orientation about a pivot axis proximate the first end of the loading platform. Kits for wheel storage apparatus are also described.

18 Claims, 14 Drawing Sheets

(51) Int. Cl.
*B60B 30/10* (2006.01)
*B62B 1/12* (2006.01)

(52) U.S. Cl.
CPC ..... *B62B 2202/031* (2013.01); *B62B 2206/02* (2013.01)

(56) References Cited

U.S. PATENT DOCUMENTS

| | | | | |
|---|---|---|---|---|
| 552,696 | A * | 1/1896 | O'Neill | B62B 1/12 280/47.29 |
| 571,705 | A * | 11/1896 | Thomas | B62B 1/12 280/47.2 |
| 599,923 | A * | 3/1898 | Atwood | B62B 1/12 280/47.29 |
| 795,147 | A * | 7/1905 | Magoffin | B62B 1/12 280/47.27 |
| 1,171,808 | A * | 2/1916 | Siberell | A47F 7/04 254/8 R |
| 1,810,812 | A * | 6/1931 | Beach | A47F 7/04 211/23 |
| 2,886,273 | A * | 5/1959 | Wachob | B65G 7/08 280/47.27 |
| 3,104,889 | A * | 9/1963 | Branch, Jr. | B62B 1/12 182/20 |
| 3,322,286 | A * | 5/1967 | Sylvester | B29D 30/0016 211/49.1 |
| 3,335,871 | A * | 8/1967 | Crisman | A47F 7/04 211/24 |
| 3,616,937 | A * | 11/1971 | Frame | A47B 87/0215 211/24 |
| 3,951,287 | A * | 4/1976 | Cofer | B60B 29/002 414/427 |
| 4,241,930 | A * | 12/1980 | Bell | B62B 1/10 280/47.29 |
| 4,659,142 | A * | 4/1987 | Kuchinsky, Jr. | B62B 1/12 297/118 |
| 5,433,469 | A * | 7/1995 | Cassels | B62B 1/264 280/655 |
| 5,464,104 | A * | 11/1995 | McArthur | A47F 5/0025 280/79.3 |
| 6,086,310 | A * | 7/2000 | Lujan, III | B62B 1/264 280/79.6 |
| D441,935 | S * | 5/2001 | Cook | D34/12 |
| D481,512 | S * | 10/2003 | Lee | B62B 1/12 D34/24 |
| 6,773,222 | B1 * | 8/2004 | Gilchrist | B60B 29/002 414/427 |
| 7,232,138 | B2 * | 6/2007 | Shubert | B60P 3/125 280/79.11 |
| D587,491 | S * | 3/2009 | Casper | D6/678.4 |
| 7,500,681 | B2 * | 3/2009 | Steadman | B62B 1/14 280/47.131 |
| D633,271 | S * | 2/2011 | Casey | D34/26 |
| 7,946,598 | B1 * | 5/2011 | Malone, Jr. | B62B 1/12 280/47.35 |
| 8,789,836 | B2 * | 7/2014 | Umbro | B62B 1/14 280/654 |
| 8,794,644 | B2 * | 8/2014 | Chen | B62B 1/22 280/47.12 |
| 8,955,700 | B2 * | 2/2015 | Barber | A47F 7/04 211/23 |
| 9,302,688 | B2 * | 4/2016 | Reddi | B62B 5/06 |
| 9,616,906 | B2 * | 4/2017 | Carlson | B62B 1/12 |
| 9,663,129 | B1 * | 5/2017 | Allen | B62B 1/12 |
| D819,291 | S * | 5/2018 | Turcotte | D34/24 |
| 10,479,140 | B2 * | 11/2019 | Lindgren | B60B 30/10 |
| 10,525,997 | B1 * | 1/2020 | Su | B62B 1/142 |
| 10,933,692 | B1 * | 3/2021 | Smith | B60B 29/002 |
| 11,254,162 | B1 * | 2/2022 | Tseng | B62B 5/064 |
| 11,292,293 | B2 * | 4/2022 | James | B65D 85/06 |
| D1,004,889 | S * | 11/2023 | Green | D34/12 |
| 2004/0156700 | A1 * | 8/2004 | Chopra | B60B 33/0049 414/430 |
| 2005/0254923 | A1 * | 11/2005 | Gorski | B62B 3/104 414/426 |
| 2006/0151248 | A1 * | 7/2006 | Rodriguez | B60B 29/002 187/222 |
| 2007/0182115 | A1 * | 8/2007 | Groomes | B62D 43/002 280/79.4 |
| 2007/0286713 | A1 * | 12/2007 | Giese | B60B 29/002 414/427 |
| 2008/0197590 | A1 * | 8/2008 | Tsai | B62B 1/002 280/47.18 |
| 2009/0152825 | A1 * | 6/2009 | Adams | B62B 1/266 383/33 |
| 2012/0153585 | A1 * | 6/2012 | Ryan | B62B 5/067 280/47.18 |
| 2016/0068017 | A1 * | 3/2016 | Lindgren | B60B 30/10 414/427 |
| 2022/0369810 | A1 * | 11/2022 | Green | A47B 81/007 |
| 2022/0371639 | A1 * | 11/2022 | Green | B62B 1/12 |
| 2023/0219369 | A1 * | 7/2023 | Panigot | B62B 1/12 280/650 |
| 2023/0219387 | A1 * | 7/2023 | McPheeters | B60D 1/54 280/407 |

FOREIGN PATENT DOCUMENTS

| | | | | |
|---|---|---|---|---|
| CA | 1037434 | A | | 8/1978 |
| CA | 1249858 | A | | 2/1989 |
| CA | 73702 | S | | 12/1993 |
| CA | 2362086 | A1 | | 5/2003 |
| CA | 2496158 | A1 | | 3/2004 |
| CA | 2573119 | A1 | | 1/2006 |
| CA | 2510335 | A1 | | 12/2006 |
| CA | 2561492 | A1 | | 3/2007 |
| CA | 2532695 | A1 * | 7/2007 | ............... A47F 7/04 |
| CA | 2804700 | A1 | | 1/2012 |
| CA | 140785 | S | | 3/2012 |
| CA | 140786 | S | | 3/2012 |
| CA | 2801467 | A1 | | 7/2013 |
| CA | 2801567 | A1 | | 7/2013 |
| CA | 154574 | S | | 3/2014 |
| CA | 161432 | S | | 11/2015 |
| CA | 183362 | S | | 5/2019 |
| CN | 105835923 | A | | 8/2016 |
| CN | 108394436 | A * | 8/2018 | ............... B62B 3/02 |
| DE | 20001023 | U1 * | 4/2000 | ............... B62B 3/02 |
| DE | 20003900 | U1 * | 7/2000 | ............... B62B 3/008 |
| DE | 202005001347 | U1 * | 4/2006 | ............... B60B 30/02 |
| DE | 10-2008-003506 | A1 | | 7/2009 |
| DE | 202012006846 | U1 * | 11/2012 | ............... B60B 30/10 |
| DE | 202015104766 | U1 * | 11/2015 | ............... B62B 1/00 |
| DE | 102014012588 | A1 * | 3/2016 | ............... A47B 81/007 |
| DE | 102017114881 | A1 * | 1/2019 | ............... B62B 3/104 |
| DE | 202020106854 | U1 * | 1/2021 | |
| EP | 0957040 | A2 | | 11/1999 |
| JP | H0891006 | A * | 4/1996 | |
| JP | H092008 | A * | 1/1997 | |
| JP | 2008087504 | A * | 4/2008 | |
| KR | 200443882 | Y1 * | 3/2009 | |
| KR | 101493609 | B1 * | 2/2015 | |
| WO | WO-2011092162 | A1 * | 8/2011 | ............... B60B 29/002 |
| WO | WO-2016043580 | A1 * | 3/2016 | ............... B62B 3/00 |

OTHER PUBLICATIONS

Notice of Allowance and Fee(s) Due for U.S. Appl. No. 29/814,990, dated Mar. 23, 2023, (9 pages), United States Patent and Trademark Office, US.

* cited by examiner

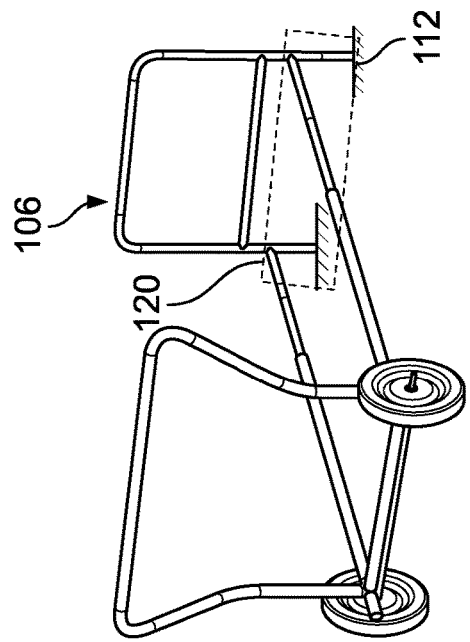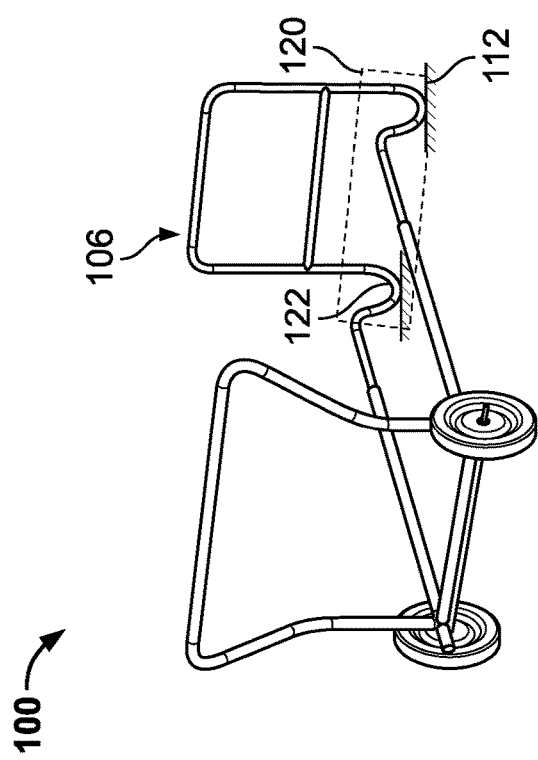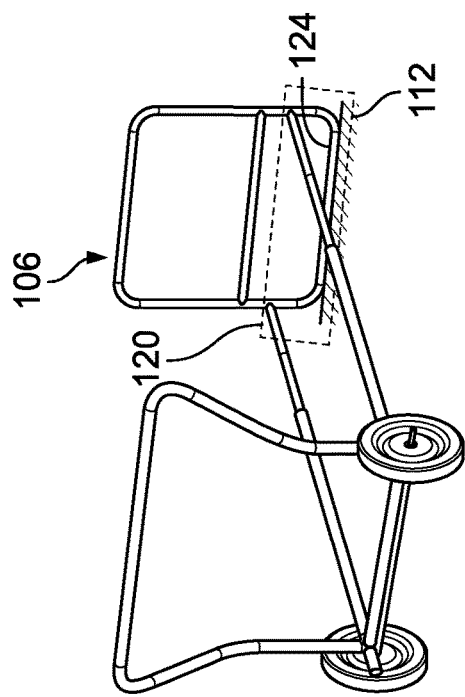
FIG. 8A
FIG. 8B
FIG. 8C

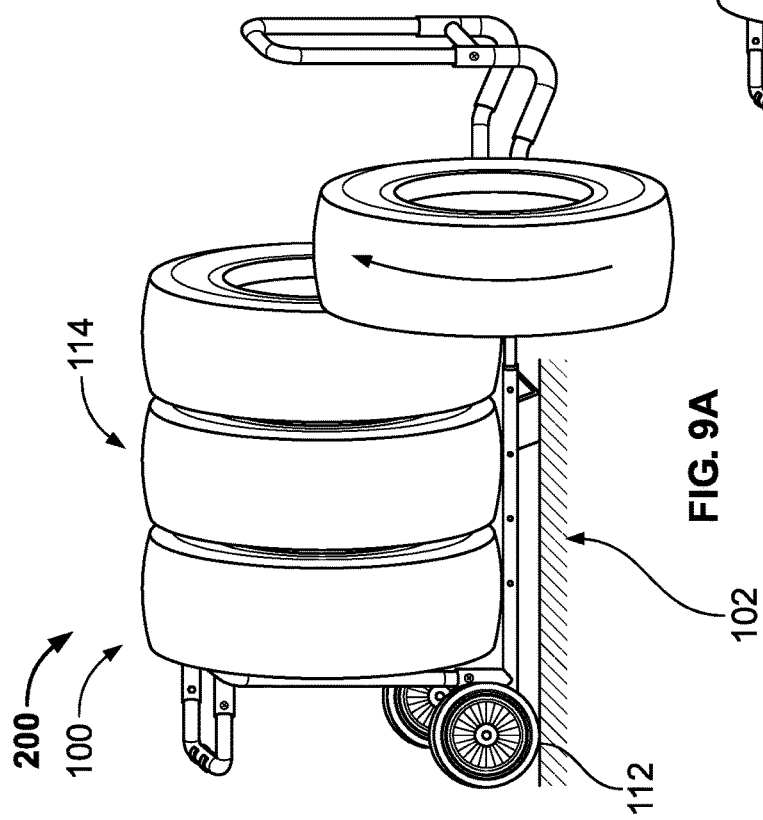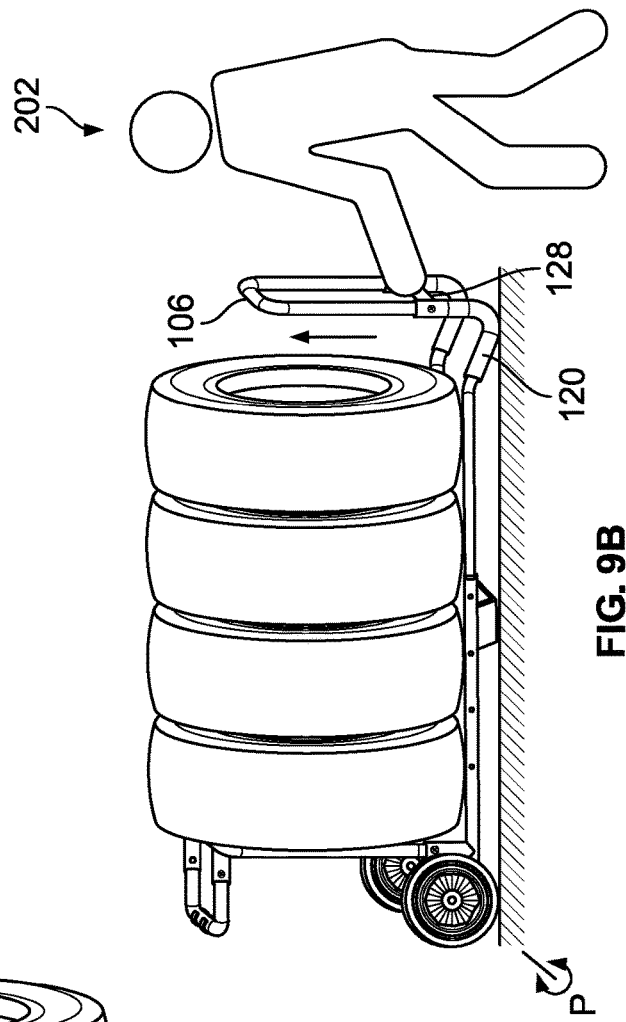

WHEEL STORAGE APPARATUS AND KIT

CROSS-REFERENCE TO RELATED APPLICATIONS

The present application claims priority to and the benefit of Canadian Patent Application Serial No. 3,119,375, filed May 21, 2021; the entire contents of which as are hereby incorporated by reference herein.

BACKGROUND

Related Field

The specification relates generally to wheel storage solutions, and specifically to wheel storage and display apparatus and kits.

Related Art

Vehicle wheels typically take up a lot of storage space, are heavy and difficult to move around and tend to appear disorganized and messy, even when stored. Existing wheel storage products typically focus on either allowing for better mobility of the wheels or getting the wheels out of the way but not both.

BRIEF SUMMARY

According to some embodiments, there is provided a wheel storage apparatus comprising a frame having a loading platform, a wheel supporting platform and a handle section. The loading platform has a first end and a second end opposing the first end, the loading platform being generally parallel with and at a loading height from a loading surface and configured to cradle a plurality of wheels about a circumferential portion of each wheel, when the wheel storage apparatus is in a first orientation. The wheel supporting platform is coupled to the first end of the loading platform and is configured to support the plurality of wheels in a stacked configuration when the wheel storage apparatus is in a second orientation. The handle section is coupled to the second end of the loading platform having a handle base shaped and positioned to support the second end of the loading platform when the wheel storage apparatus is in the first orientation.

According to some embodiments, the wheel supporting platform is further configured to help support the loading platform at the loading height when the wheel storage apparatus is in the first orientation.

According to some embodiments, the loading platform comprises a pair of struts, the pair of struts being generally elongate and parallel to each other. According to some embodiments, the pair of struts are spaced apart from each other on center at a distance of about 13 to about 20 inches.

According to some embodiments, the wheel storage apparatus further comprises at least one transverse brace coupled to the loading platform and configured to support the loading platform at the loading height when the wheel storage apparatus is in the first orientation.

According to some embodiments, the loading portion is adjustable in at least one direction. According to some embodiments, the loading portion is extensible. According to some embodiments, the loading platform comprises telescoping portions.

According to some embodiments, the handle base is P-shaped and the arcuate portion of the P-shape is in contact with the loading surface when in the first orientation.

According to some embodiments, the loading height is about 1 inch to about 6 inches. According to some embodiments, the loading height is about 3 inches.

According to some embodiments, the wheel supporting platform comprises a secondary support.

According to some embodiments, the wheel storage apparatus further comprises a wheel assembly, wherein the pivot axis is generally aligned with an axle of the wheel assembly.

According to some embodiments, the handle portion is a generally unitary member.

According to some embodiments, the handle section comprises a transverse bar.

According to some embodiments, there is provided a kit for a wheel storage apparatus. The kit comprises a frame comprised of a plurality of separate frame portions configured to be coupled, directly or indirectly, with each other. The frame portions comprise at least one loading platform portion, at least one wheel supporting platform and at least one handle portion. The at least loading portion, when the wheel storage apparatus is assembled and in a first orientation, is at a loading height from a loading surface and configured to cradle a plurality of wheels about a circumferential portion of each wheel. The at least one wheel supporting platform portion, when the wheel storage apparatus is assembled, is configured to support the plurality of wheels in a stacked configuration when the wheel storage apparatus is in a second orientation and to support the loading platform when the wheel storage apparatus is in the first orientation. The at least one handle portion includes at least one handle base shaped portion that, when the wheel storage apparatus is assembled and in the first orientation, is positioned to support at least an end of the loading platform when the wheel storage apparatus is in the first orientation.

According to some embodiments, the at least one wheel supporting platform portion is configured to couple to a first end of the at least one loading platform portion and the at least one handle portion is configured to couple to a second end of the loading platform, the second end opposite the first end.

According to some embodiments, the at least one loading platform portion, the at least one wheel supporting platform portion and the at least one handle portion are each comprised of a plurality of interconnectable tubular sections.

According to some embodiments, the kit further comprises a wheel assembly configured to couple to at least one of the loading platform portion and the wheel supporting portion, and at least one wheel attachment member configured to operatively couple the wheel assembly to the frame.

BRIEF DESCRIPTIONS OF THE DRAWINGS

For a better understanding of the various implementations described herein and to show more clearly how they may be carried into effect, reference will now be made, by way of example only, to the accompanying drawings in which:

FIGS. 8A to 8C depict schematics of various shapes and configurations of a handle of a wheel storage apparatus, according to non-limiting embodiments;

FIGS. 9A to 9D depict a method of operation for a wheel storage apparatus, according to non-limiting embodiments;

DETAILED DESCRIPTION OF VARIOUS EMBODIMENTS

Figure 1B:
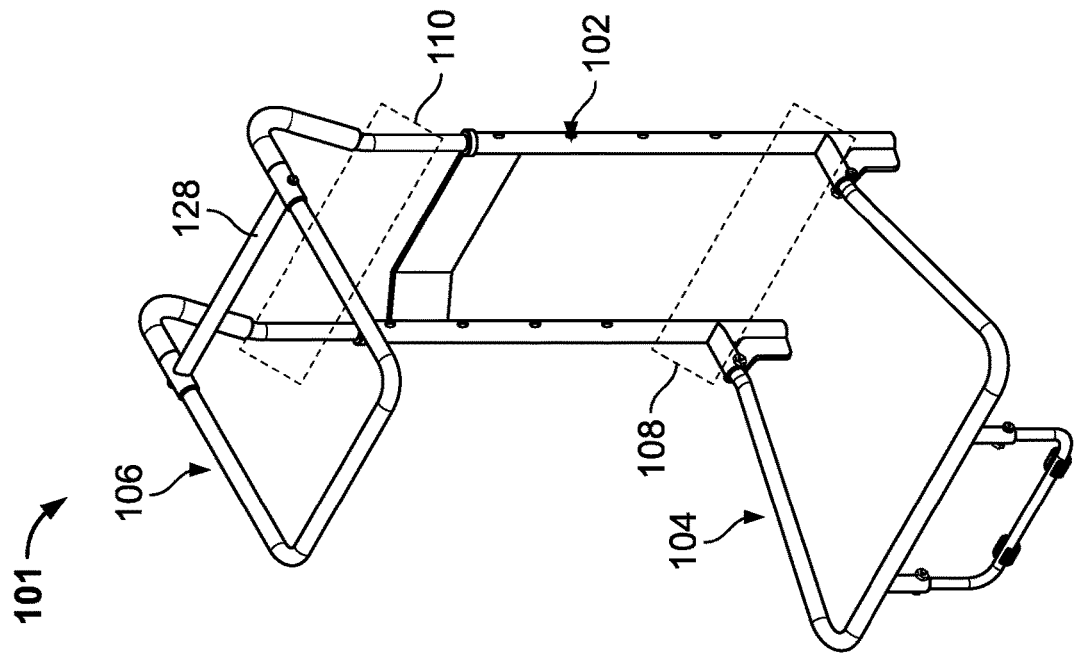
FIG. 1B depicts a front perspective view of a wheel storage apparatus, according to non-limiting embodiments.

Herein described are apparatus and kits for storing vehicle wheels. It is understood that references to a "wheel" or "wheels" mean the rim, tire and any combination(s) thereof (for example, where a wheel comprises a tire mounted on a rim or the "wheels" comprise one or more tires, rims and tires mounted on rims). According to at least some embodiments, the described apparatus and kits enable a user to move and store a plurality of vehicle wheels. According to some embodiments, the described apparatus and kits provide a compact wheel storage solution which requires less lifting and manual positioning of the wheels. According to some embodiments, the described apparatus and kits include features that have improved ergonomics over existing wheel storage systems.

It will be appreciated that for simplicity and clarity of illustration, where considered appropriate, reference numerals may be repeated among the figures to indicate corresponding or analogous elements. In addition, numerous specific details are set forth in order to provide a thorough understanding of the exemplary aspects of the present application described herein. However, it will be understood by those of ordinary skill in the art that the exemplary aspects described herein may be practiced without these specific details. In other instances, well-known methods, procedures and components have not been described in detail so as not to obscure the exemplary aspects described herein. Also, the description is not to be considered as limiting the scope of the exemplary aspects described herein. Any systems, method steps, method blocks, components, parts of components, and the like described herein in the singular are to be interpreted as also including a description of such systems, method steps or tasks, components, parts of components, and the like in the plural, and vice versa.

Figure 1A:
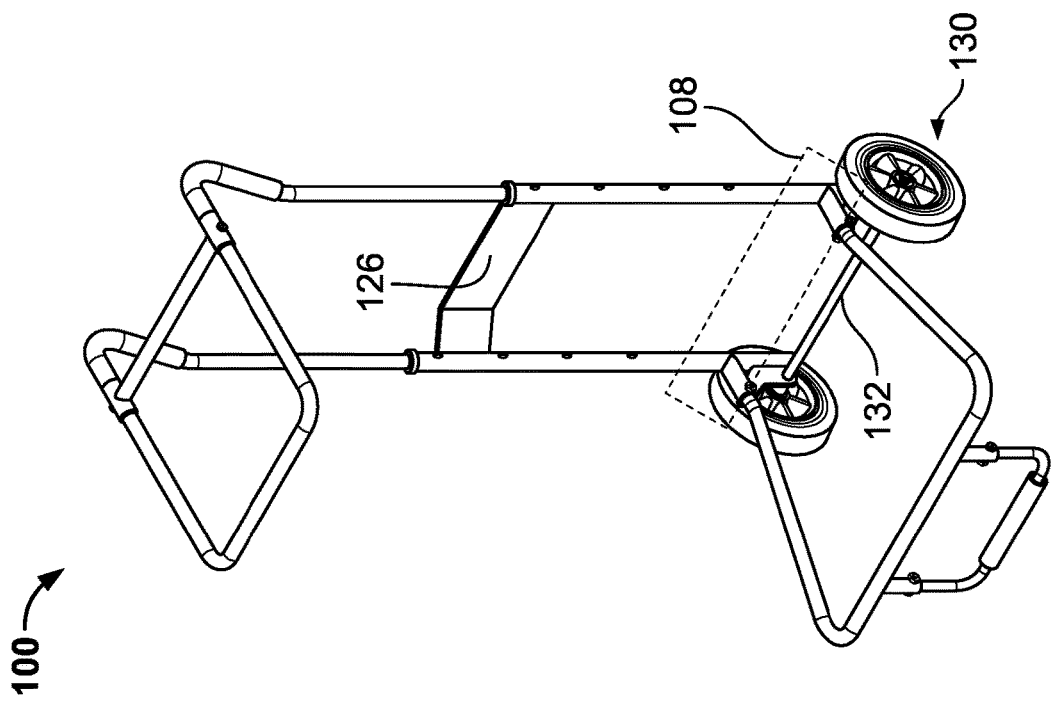
FIG. 1A depicts a front perspective view of a wheel storage apparatus, according to non-limiting embodiments.
Figure 2:
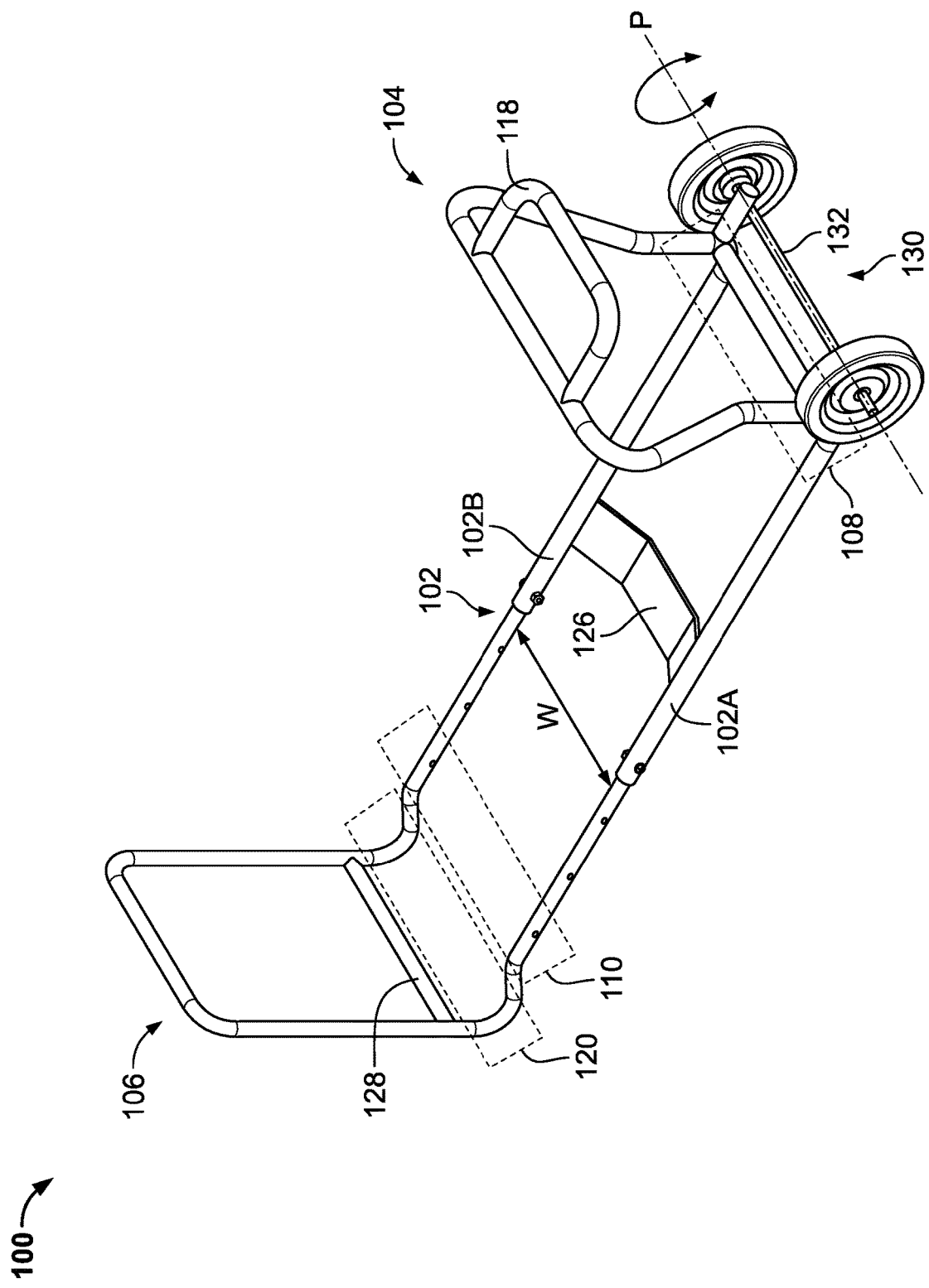
FIG. 2 depicts a front perspective view of a wheel storage apparatus in a first orientation, according to non-limiting embodiments.
Figure 3A:
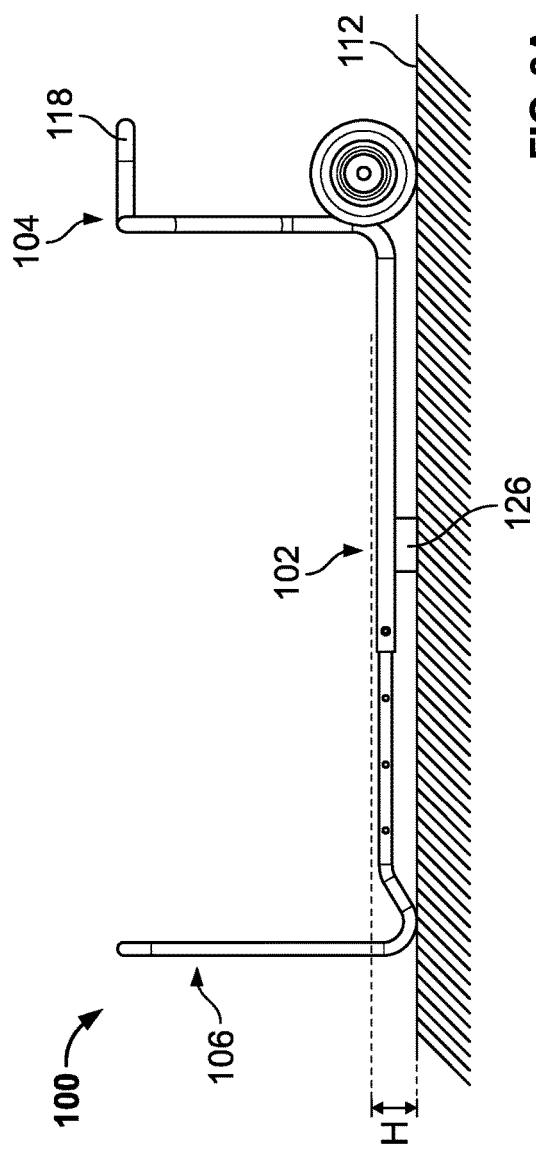
FIGS. 3A and 3B depict a side elevation view of a wheel storage apparatus, according to non-limiting embodiments.
Figure 3C:
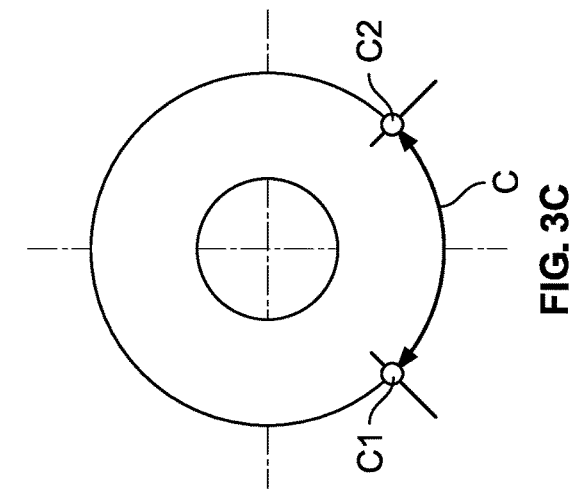
FIG. 3C depicts a schematic of a wheel as supported by a wheel storage apparatus, according to non-limiting embodiments.
Figure 3B:
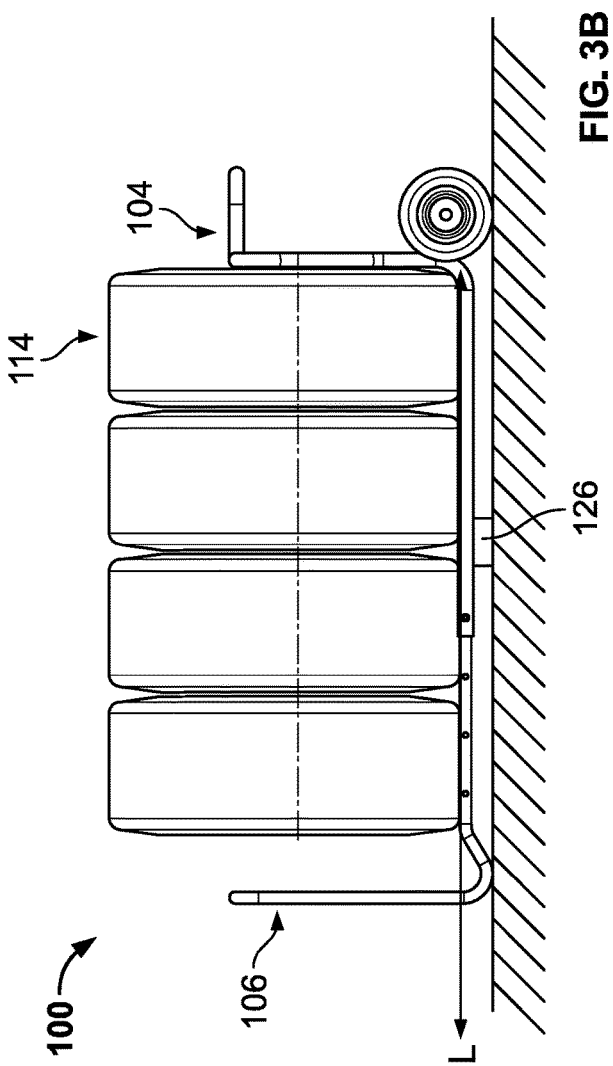

Attention is directed to FIGS. 1A to 6 which depict an exemplary wheel storage apparatus 100, according to non-limiting embodiments. Wheel storage apparatus 100 comprises frame 101 (FIG. 1B). Frame 101 comprises loading platform 102, wheel supporting platform 104 and handle section 106. Loading platform 102 comprises first end 108 and second end 110, opposite first end 108. When wheel storage apparatus 100 is in a first orientation, as shown in FIGS. 2 to 3B, for example, loading platform 102 is generally parallel with and at a loading height, H, from loading surface 112, and is configured to cradle a plurality of wheels, such as wheels 114, about a circumferential portion of each wheel, such as circumferential portion, C, (FIG. 3C). For example, according to some embodiments, loading platform 102 contacts and supports wheels 114 on two or more points about circumferential portion, C, such as C1 and C2. According to some embodiments, loading platform 102 comprises a member that contacts all of circumferential portion, C. Loading height, H, is any suitable distance from loading surface 112 that allows at least one of the plurality of wheels to be rolled from loading surface 112 onto loading platform 102 without lifting. According to some embodiments, loading height, H, is about 1 inch to about 6 inches. According to some embodiments, loading height, H, is about 3 inches.

Figure 11:
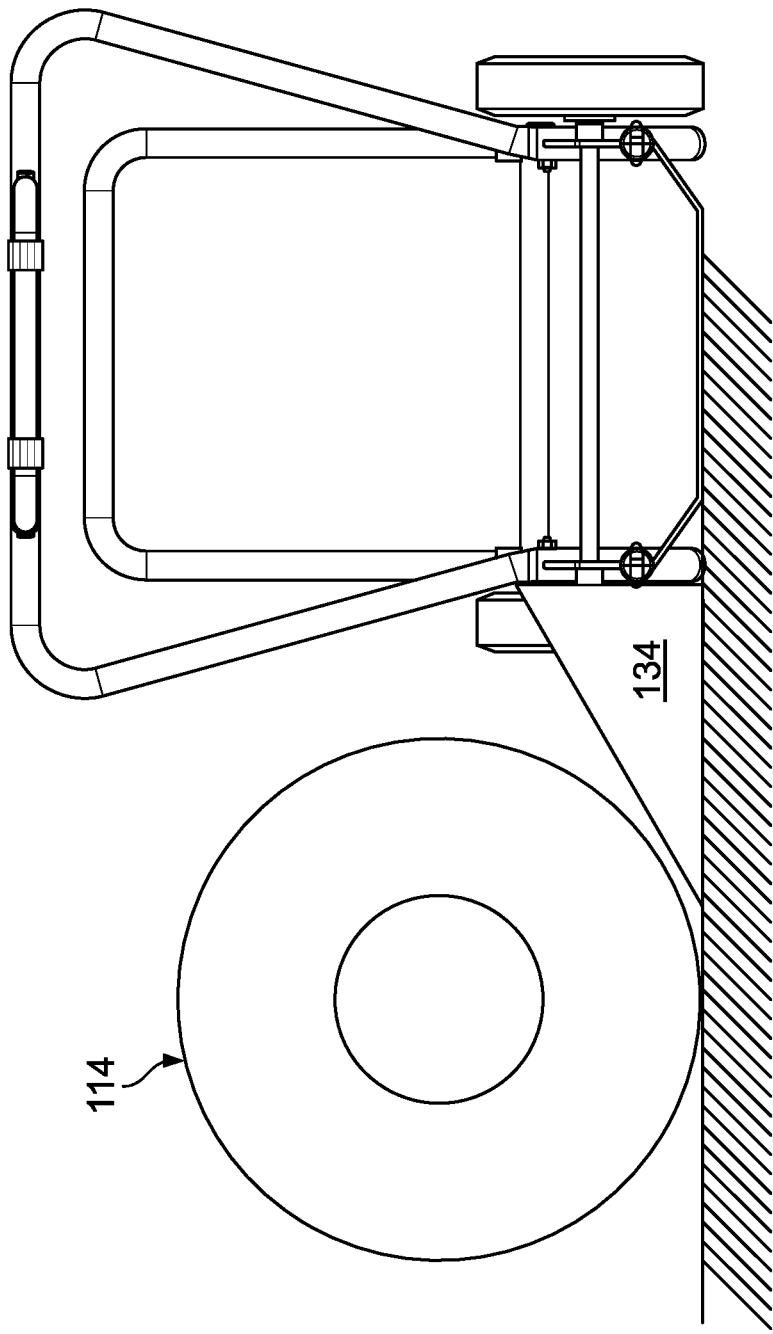
FIG. 11 depicts a wheel storage apparatus having a loading ramp, according to non-limiting embodiments.

According to some embodiments, wheel storage apparatus 100 comprises a loading ramp, such as ramp 134 (FIG. 11), which may be used to roll wheels 114 onto loading platform 102. According to some embodiments, ramp 134 is detachable from loading platform 102. According to some embodiments, ramp 134 is configured to collapse and/or fold when not in use. It is understood that any suitably configured ramp is contemplated.

Loading platform 102 comprises any suitable shape and combination of structural members. According to some embodiments, loading platform 102 comprises a pair of struts, such as struts 102A and 102B, being generally elongate and parallel to each other. According to some embodiments, struts 102A and 102B are spaced apart from each other on center at a distance of about 13 inches to about 20 inches. According to some embodiments, loading platform 102 comprises at least one transverse brace, such as transverse brace 126, for additional stability (to resist flexure and torsion). According to some embodiments, the transverse brace(s) may be configured to provide additional support for the loading platform and/or assist in positioning the loading platform at the loading height when the wheel storage apparatus is in the first orientation. For example, as shown in FIGS. 3A and 3B, transverse brace 126 is configured to contact loading surface 112 and support loading platform 102 at a distance away from loading surface 112. It is understood that any suitable configuration and shape of the transverse brace(s) is contemplated.

Figure 4B:
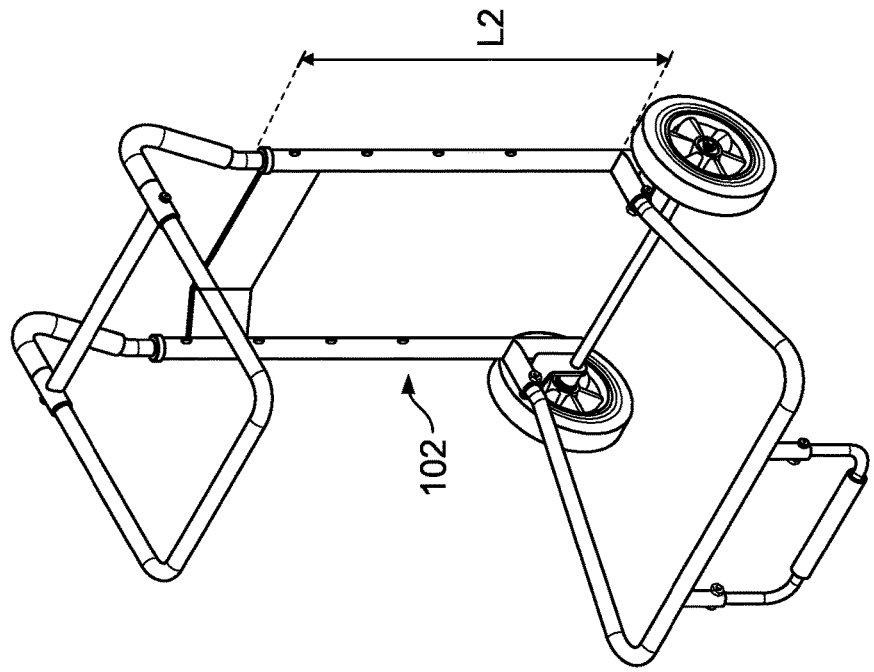
FIGS. 4A and 4B depict a front perspective of a wheel storage apparatus having a loading platform that is extensible and/or retractable in length, according to non-limiting embodiments.
Figure 4A:
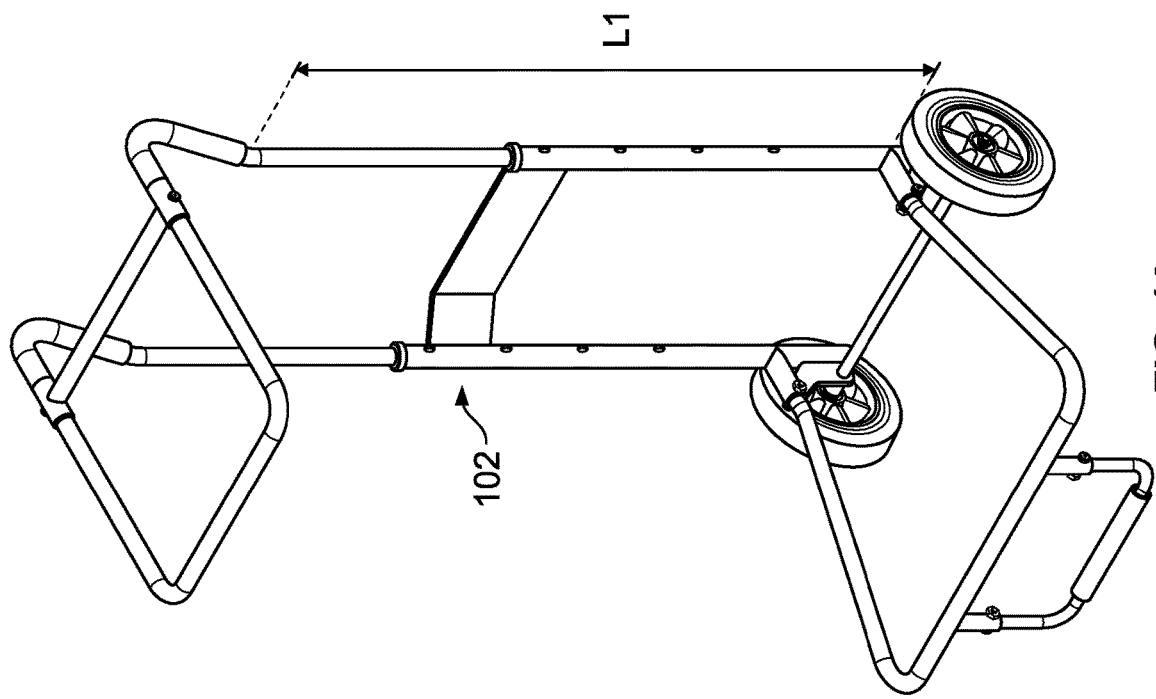

Additionally, according to some embodiments, loading platform 102 is adjustable in at least one direction, such as length, L (FIG. 3B), to accommodate variety of widths and number of wheels. For example, according to some embodiments, loading platform 102 is extensible and/or retractable to adjust the length, L, to a desired length (such as from a first length, L1, to a second length, L2, and vice versa, as shown in FIGS. 4A and 4B). According to some embodiments, the length, L, can be adjusted to a length from about 42 inches to about 58 inches. According to some embodiments, loading platform 102 comprises telescoping portions. For example, according to some embodiments, struts 102A and 102B are each comprised of telescoping portions which may allow for adjustments in the length of each strut.

According to some embodiments, loading platform 102 is adjustable in width, W (FIG. 2), to accommodate a variety of wheel diameters. According to some embodiments, loading platform 102 is adjustable in both length, L, and width, W, directions. According to some embodiments, width, W, is about 15 inches. According to some embodiments, length, L, is about 32.6 inches to about 47.6 inches.

Figure 5B:
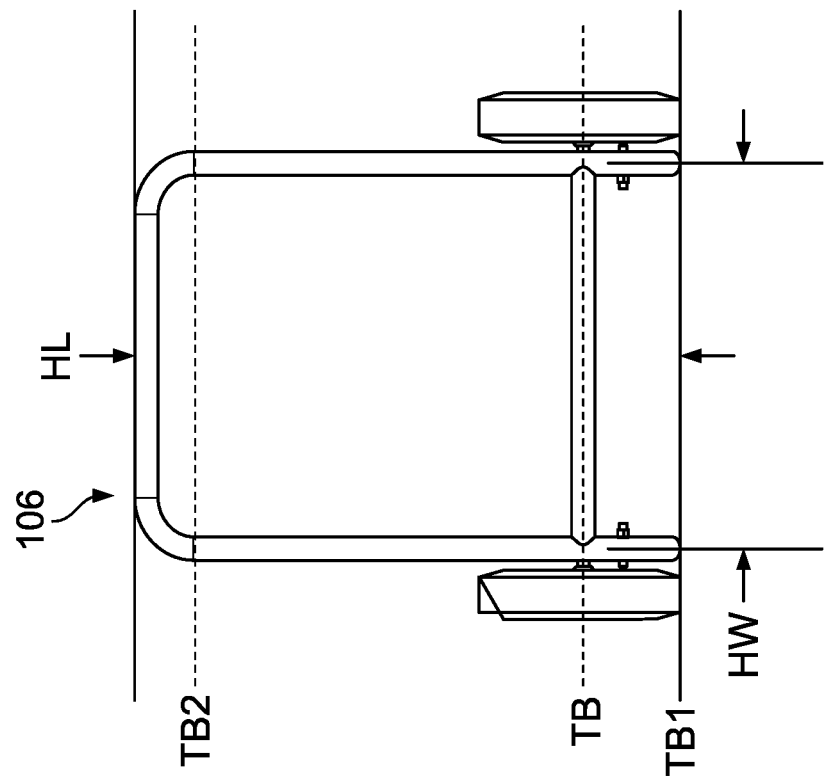
FIGS. 5A and 5B depict front and rear elevation views of a wheel storage apparatus in a first orientation, according to non-limiting embodiments.
Figure 5A:
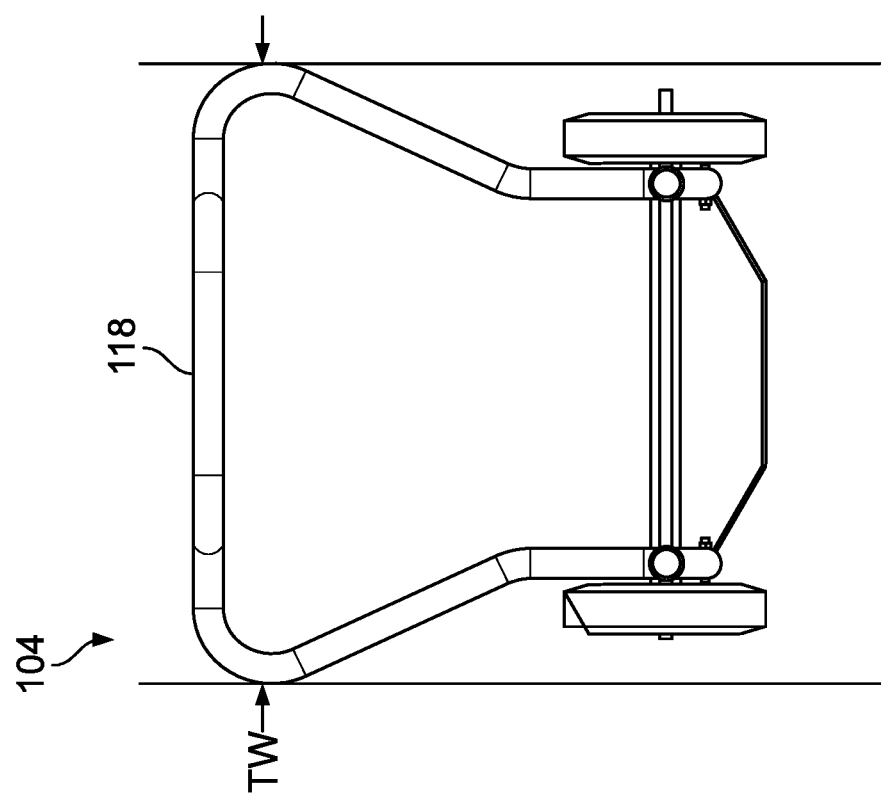
Figure 6:
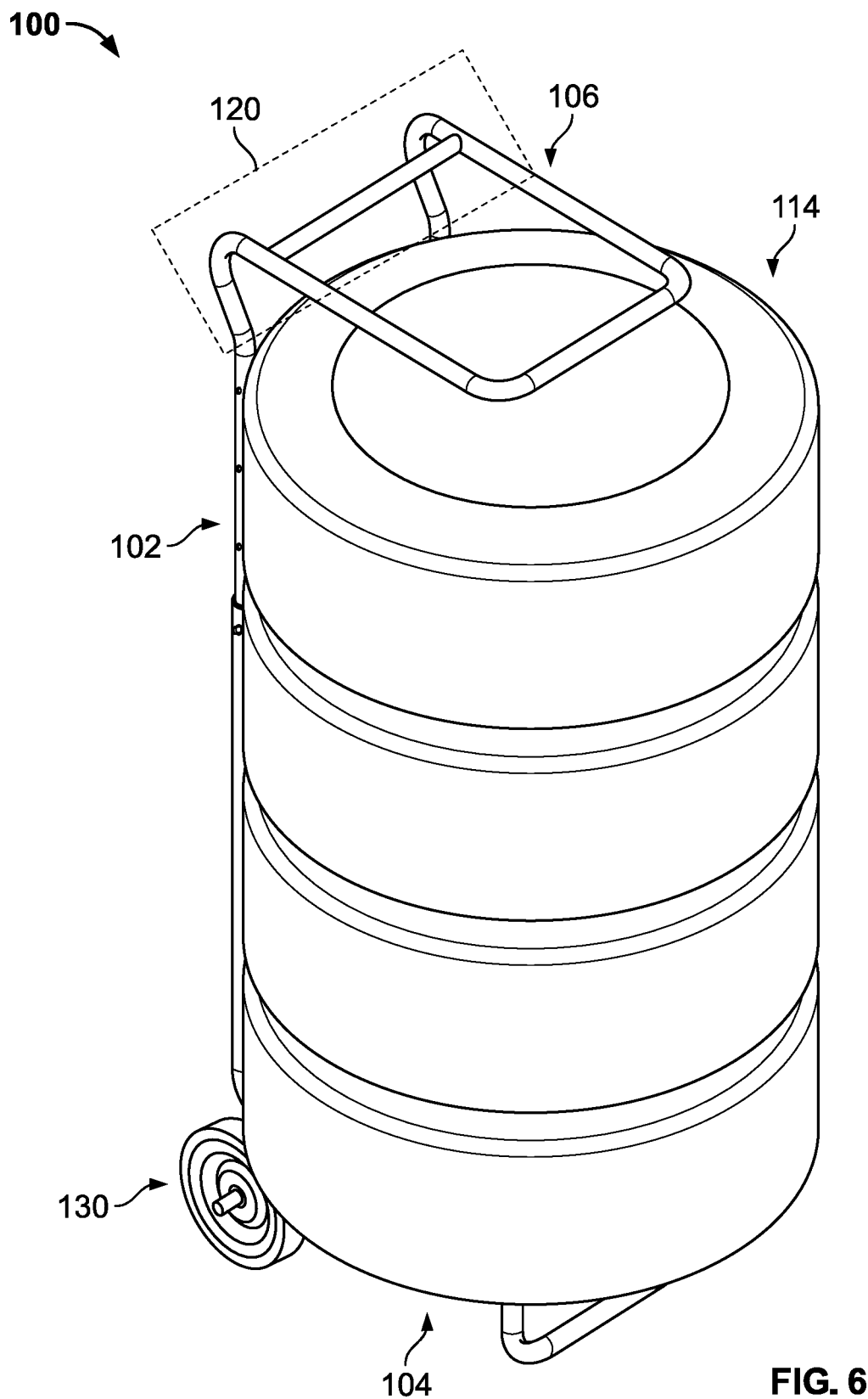
FIG. 6 depicts a front perspective view of a wheel storage apparatus in a second orientation with a plurality of tires in a stacked configuration, according to non-limiting embodiments.

Wheel supporting platform 104 is configured to support a plurality of wheels, such as wheels 114, in a stacked configuration when wheel storage apparatus 100 is in a second orientation (as shown in FIG. 6). For example, according to some embodiments, wheel supporting platform 104 is sized and shaped to support the weight of a plurality of wheels. For example, as shown in FIG. 5A, a portion of wheel supporting platform 104 may have a width, TW, sized to support the weight of a plurality of wheels and prevent at least one of the wheels from falling off the wheel supporting platform 104 when the wheels are being transported using wheel storage apparatus 100. According to some embodiments, TW is about 24 to about 26 inches. According to some embodiments, TW is about 24.4 inches. According to some embodiments, wheel supporting platform 104 further comprises secondary support 118, which may help prevent flexure of wheel supporting platform 104 under the weight of a plurality of wheels when wheel storage apparatus 100 is in the second orientation. According to some embodiments, secondary support 118 is sized, shaped and/or positioned to maintain wheel supporting platform 104 in a generally horizontal position to help prevent wheels 114 from falling off of wheel supporting platform 104 when wheel storage apparatus 100 is in the second orientation. According to some embodiments, secondary support 118 comprises a kickstand.

Figure 7:
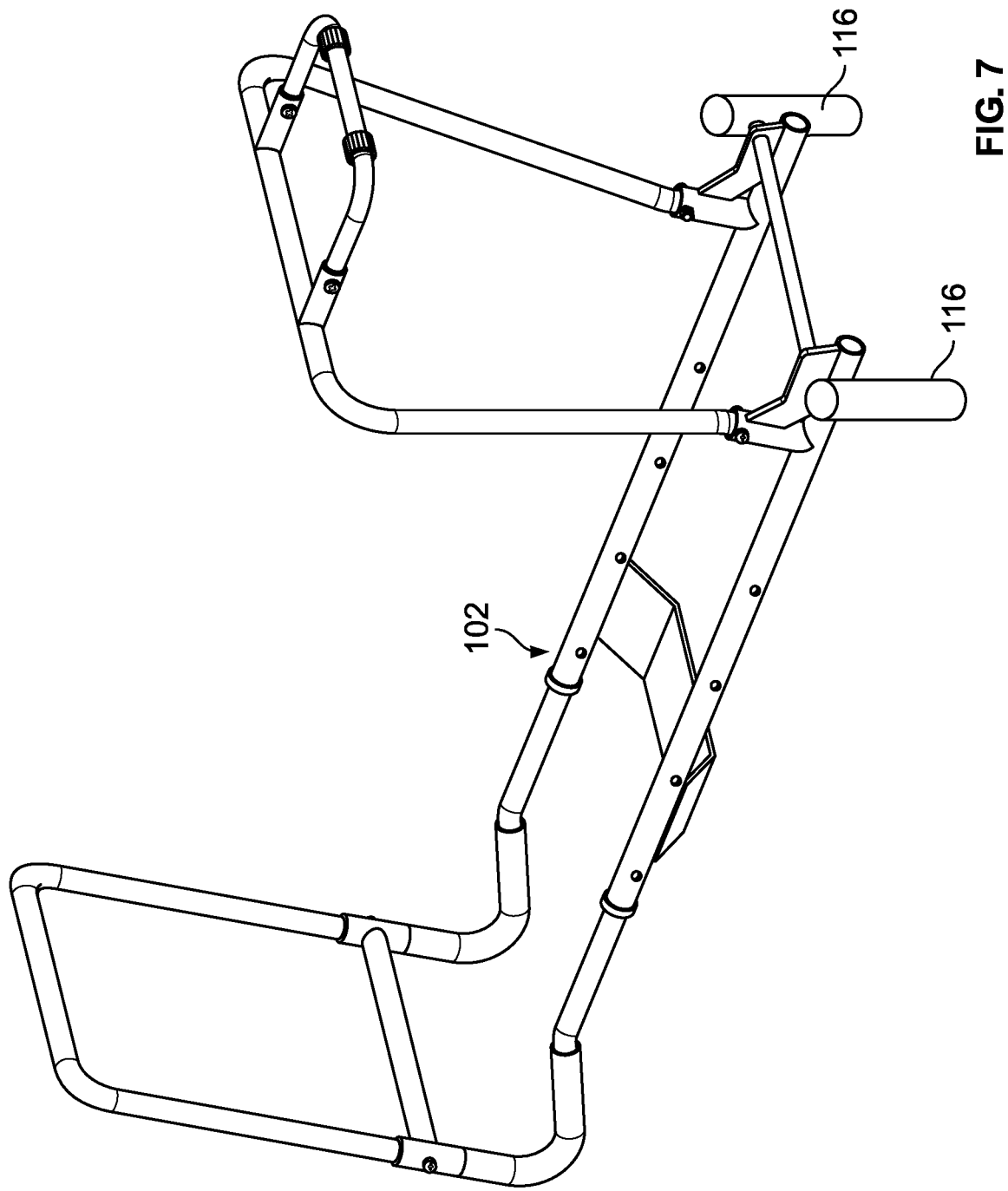
FIG. 7 depicts a front perspective view of a wheel storage apparatus in a first orientation, according to non-limiting embodiments.

According to some embodiments, wheel supporting platform 104 is further configured to support loading platform 102 at loading height, H, when wheel storage apparatus 100 is in the first orientation (as shown in FIGS. 3A and 3B). For example, according to some embodiments, wheel supporting platform 104 may comprise supports 116 (FIG. 7). According to some embodiments, wheel storage apparatus 100 comprises wheel assembly 130 (described further below) coupled to wheel supporting platform 104 sized and positioned to help support loading platform 102 at loading height, H, when wheel storage apparatus 100 is in the first orientation.

Handle section 106 is coupled to the second end 110 of loading platform 102 (FIG. 2). Handle section 106 is shaped and positioned to enable a user to grasp, lift and move wheel storage apparatus 100. For example, handle section 106 is shaped and positioned to help enable a user to push or shift wheel storage apparatus 100 when in a first orientation, to help enable a user to lift and alter the orientation of wheel storage apparatus 100 between a first orientation and a second orientation (and vice versa), and/or to push or pull wheel storage apparatus 100 when in a first or second orientation, or an orientation therebetween. For example, as shown in FIG. 5B, handle section 106 has a length, HL, of about 18 inches and a width, HW, of about 15 inches. According to some embodiments, HL is about 24.6 inches. According to some embodiments, handle section 106 is a generally unitary member.

In addition, handle section 106 comprises a handle base 120 shaped and positioned to support second end 110 of loading platform 102 when wheel storage apparatus 100 is in the first orientation. Handle base 120 may take a variety of shapes and configurations suitable for supporting wheel storage apparatus 100 in the first orientation, non-limiting examples of which are depicted in FIGS. 8A to 8C. According to some embodiments, handle base 120 is P-shaped such that the arcuate portion (such as arcuate portion 122) is in contact with loading surface 112 when wheel storage apparatus 100 is in the first orientation (FIG. 8A). According to some embodiments, handle base 120 is generally linear in shape and in contact with loading surface 112 when wheel storage apparatus 100 is in the first orientation (FIG. 8B). According to some embodiments, handle base 120 comprises a U-shaped member (such as U-shaped member 124) that is in contact with loading surface 112 when wheel storage apparatus 100 is in the first orientation (FIG. 8C).

As discussed above, the described wheel storage apparatus is configured to move from a second orientation, as shown in FIG. 2, and a first orientation, as shown in FIGS. 1A and 1B. In particular, the described wheel storage apparatus is configured to rotate from the second orientation to the storage orientation about a pivot axis proximate the first end of the loading platform, such as pivot axis, P, proximate first end 108 (FIG. 2). According to some embodiments, the described wheel storage apparatus further comprises at least one wheel assembly, such as wheel assembly 130. According to some embodiments, the pivot axis is generally aligned with an axle of at least one wheel assembly, such as axle 132 of wheel assembly 130.

It is understood that the weight and/or size of the wheels to be loaded and stored usually requires a great deal of effort. With that in mind, according to some embodiments, wheel storage apparatus 100 comprises certain features to help improve the ergonomics. For example, according to some embodiments, wheel storage apparatus 100 comprises at least one graspable transverse bar, such graspable transverse bar 128 which comprises handle section 106 (see, for example, FIG. 2). According to some embodiments, graspable transverse bar 128 is located along handle section 106 at a position at or between handle base 120, such as TB1, and 0.8 of HL, such as TB2, (FIG. 5B). According to some embodiments, graspable transverse bar 128 is located at a position 1/3 of HL, such as TB (FIG. 5B). According to some embodiments, graspable transverse bar 128 is located at a height of about 6.0 inches from handle base 120.

Figure 12B:
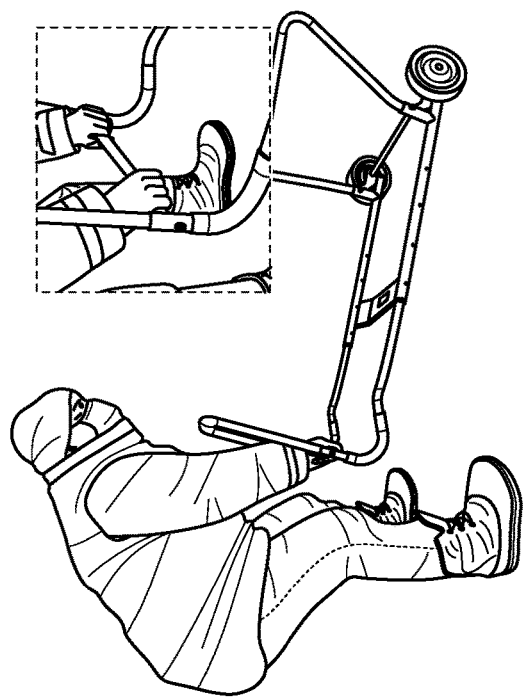
FIGS. 12A to 12F depict use of a handle in operating a wheel storage apparatus, according to non-limiting embodiments.
Figure 12C:
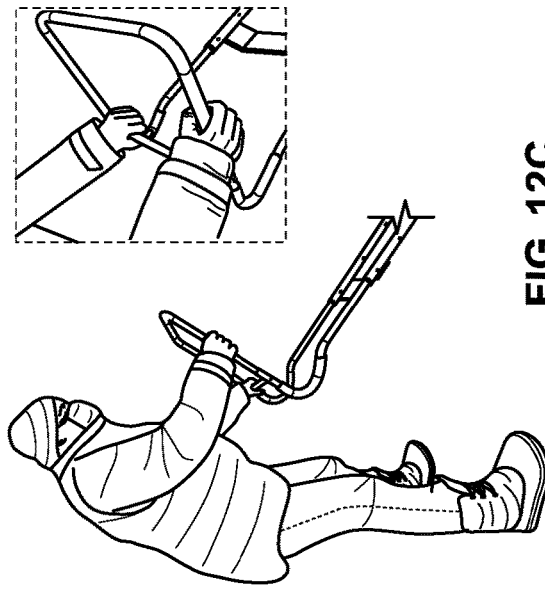
Figure 12A:
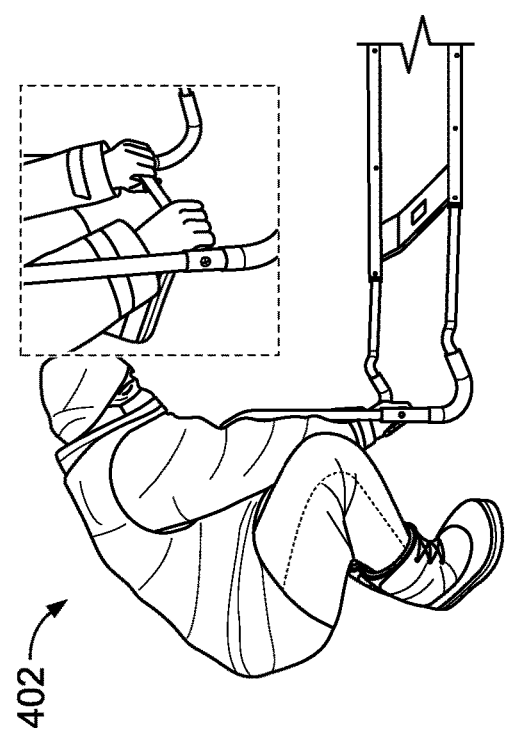
Figure 12E:
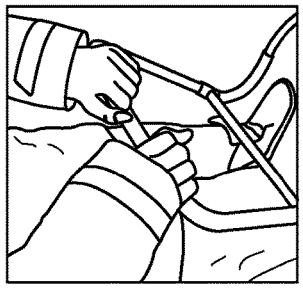
Figure 12E:
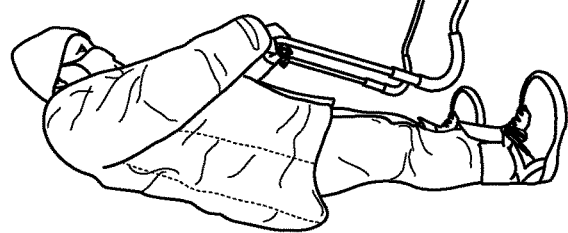
Figure 12F:
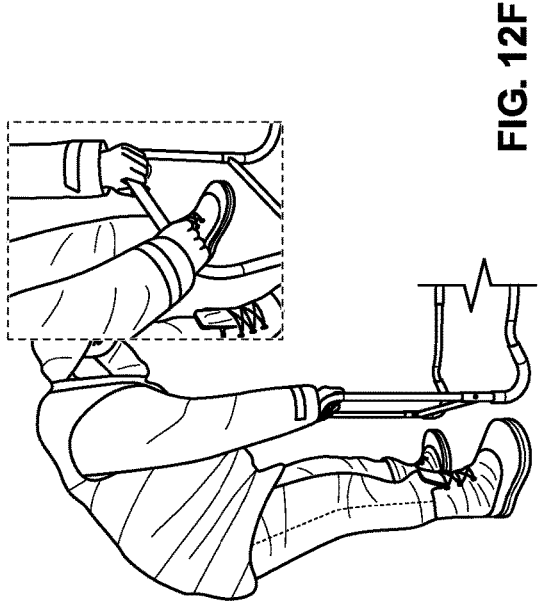
Figure 12D:
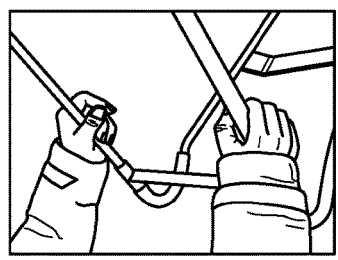
Figure 12D:
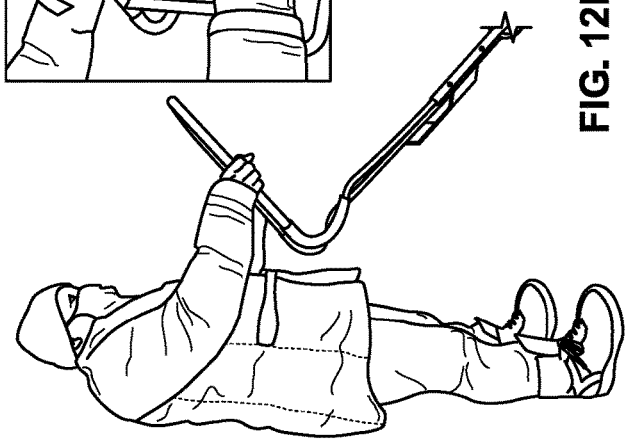

FIGS. 12A to 12F illustrate how handle section 106 with graspable transverse bar 128 may exhibit improved ergonomics when moving wheel storage apparatus 100 between a first orientation and a second orientation, according to non-limiting embodiments. A user, such as user 402, bends down and grasps graspable transverse bar 128 (FIG. 12A). Graspable transverse bar 128 is positioned such that when user 402 is in a stooped position they are able to grasp in an overhand position (palm facing user 402). Holding onto graspable transverse bar 128, user 402 then moves to a standing position, pushing upwards with their legs, lifting wheel storage apparatus 100 to a first intermediate position (intermediate the first orientation and second orientations discussed above) about a pivot axis proximate a distal end of loading platform 102 away from the user (as described above) (FIG. 12B). Positioning the handle section 106, including the graspable transverse bar 128, in this manner allows user 402 to make use of the mechanical advantage provided by configuration of wheel storage apparatus 100 as a second-class lever when lifting a significant portion of the weight wheel storage apparatus 100 (with or without wheels). When closer to an upright orientation, user 402 is able to transition his grasp from an overhand position on the graspable transverse bar 128 to a position holding the sides of handle 106 while continuing to rotate wheel storage apparatus 100 about the pivot axis (FIG. 12D). In this position, user 402 may push or pull wheel storage apparatus 100 along the loading surface. In returning wheel storage apparatus 100 to the first position, user 402 is able to use an overhand grasp along the top of handle section 106 (FIGS. 12E and 12F).

Attention is now directed to FIGS. 9A to 9D which depict example method 200 of operation for the described wheel storage apparatus, according to non-limiting embodiments. In order to assist with the explanation of method 200, it will be assumed that method 200 is performed using example wheel storage apparatus 100, as indicated. Furthermore, the following discussion of method 200 will lead to a further understanding of wheel storage apparatus 100, and the various components thereof. However, it is to be understood that wheel storage apparatus 100 and/or method 200 can be varied and need not work exactly as discussed herein in conjunction with each other, and that such variations are within the scope of the present application. It is to be emphasized, however, that method 200 need not be performed in the exact sequence shown, unless otherwise indicated. It is also understood that method 200 can be implemented on variations of wheel storage apparatus 100 as well.

As shown in FIG. 9A, wheel storage apparatus 100 is placed in a first orientation on loading surface 112. According to some embodiments, length, L, of loading platform 102 is adjusted to a desired length based on the size of the wheel or wheels to be loaded onto loading platform 102. Wheels 114 are then rolled onto loading platform 102, usually one at a time, so that each wheel is cradled about a circumferential portion.

As shown in FIG. 9B, while wheel storage apparatus 100 is in the first orientation, user 202 grasps handle 106 (using transverse bar 128, for example) and lifts wheel storage apparatus 100 to rotate about pivot axis P until it is in a comfortable position to shift the user's grip onto handle base 120, which may comprise a "P-shaped" portion. At this stage, user 202 may move wheel storage apparatus 100 along loading surface 112 to a desired location. According to some embodiments, as shown in FIG. 9B, wheel storage apparatus 100 may be moved along loading surface 112 with the assistance of wheel assembly 130.

Figure 9D:
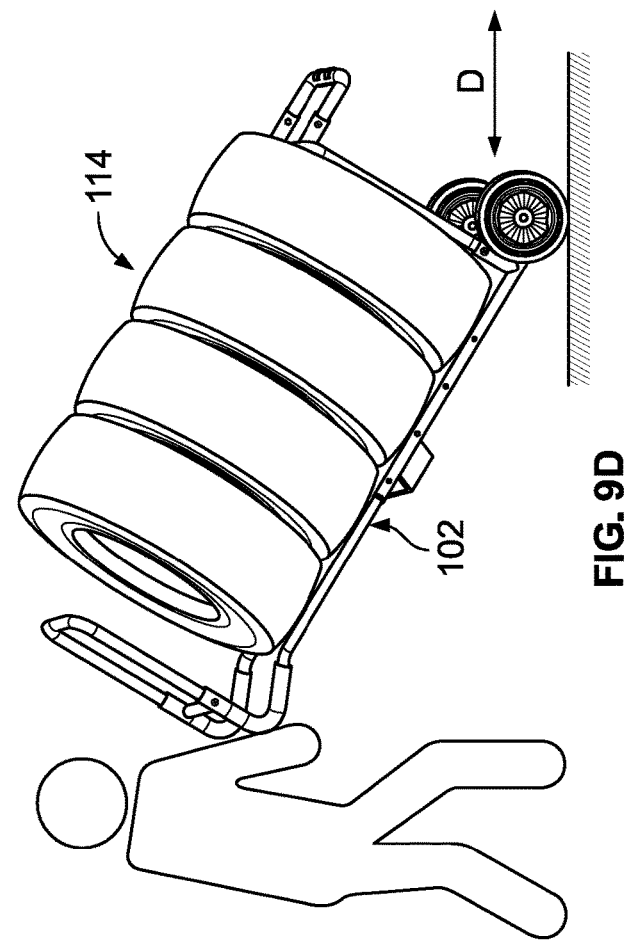
Figure 9C:
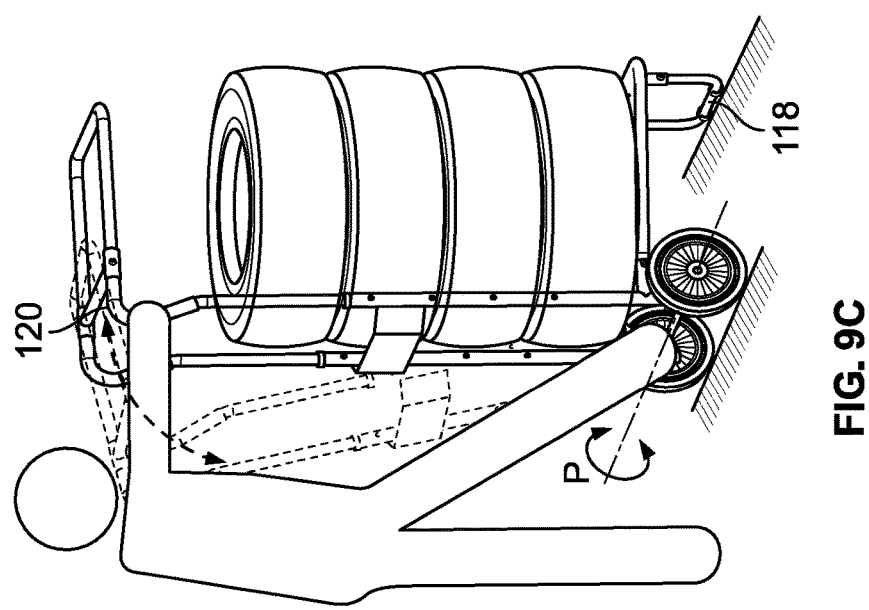

As shown in FIG. 9C, user 202 continues to lift and rotate wheel storage apparatus 100 until it is in a second orientation. According to some embodiments, while in the second orientation secondary support 118 is in contact with loading surface 112. According to some embodiments, user 202 rests a foot on axle 132 or other suitably positioned member for additional stability during rotation about pivot axis, P.

As shown in FIG. 9D, according to some embodiments, in order to move wheel storage apparatus 100 along loading surface 112 in direction, D, user 202 rotates wheel storage apparatus 100 about pivot axis P to an orientation between the first orientation and the second orientation, shifting at least a portion of the weight of wheels 114 to rest on loading platform 102. User 202 then shifts wheel storage apparatus 100 along loading surface 112 (which may be assisted by wheel assembly 130).

Figure 10:
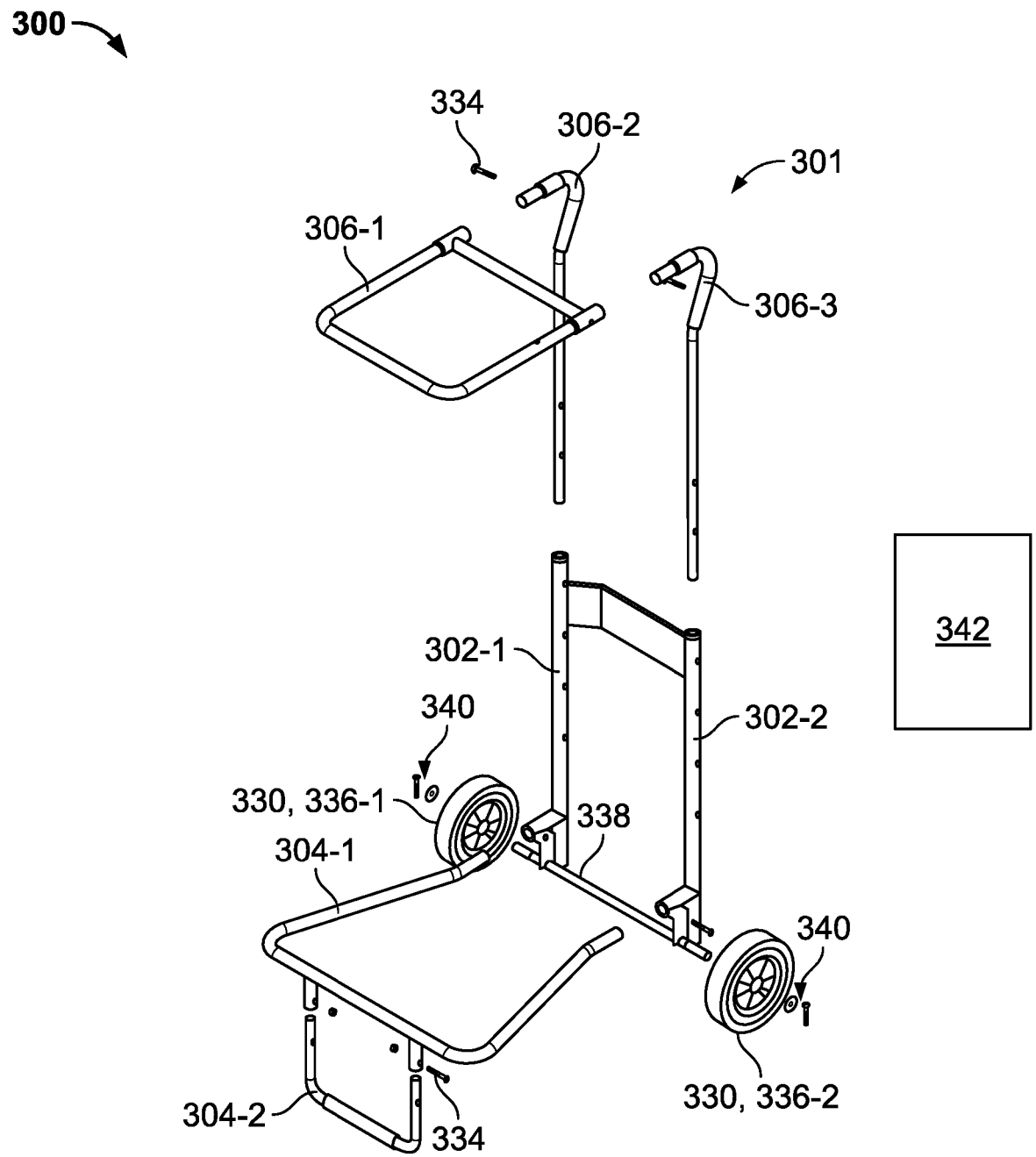
FIG. 10 depicts a kit for a wheel storage apparatus, according to non-limiting embodiments.

According to some embodiments, the described wheel storage apparatus may be provided as a kit. FIG. 10 depicts an example kit 300 for a wheel storage apparatus, according to non-limiting embodiments. Kit 300 comprises frame 301, which comprises a plurality of frame portions configured to couple, directly or indirectly, with each other. The frame portions comprise at least one loading platform portion, such as loading platform portions 302-1 and 302-2, at least one wheel supporting platform portion, such as wheel supporting platform portions 304-1 and 304-2, and at least one handle portion, such as handle portions 306-1, 306-2 and 306-3. Handle portions 306-2 and 306-3 are handle-base shaped.

As shown in FIG. 10, according to some embodiments, the frame portions may comprise a plurality of interconnectable tubular sections. For example, ends of handle portion 306-3 are configured to nest in an end of handle portion 306-1 and an end of loading platform portion 302-2. According to some embodiments, loading platform portions 302-1 and 302-2 comprise a pair of generally elongate and parallel struts, as discussed above in respect of loading platform 102.

According to some embodiments, kit 300 comprises one or more fasteners, such as fasteners 334. Any suitable items or devices for coupling the frame portions together are contemplated. For example, according to some embodiments, fasteners 334 comprise one of more bolts, pins, nuts and washers.

According to some embodiments, kit 300 further comprises a wheel assembly, such as wheel assembly 330. As shown in FIG. 10, wheel assembly 330 may comprise a pair of wheels, such as wheels 336-1 and 336-2, an axle, such as axle 338, and wheel assembly attachment members 340. Wheel assembly attachment members 340 comprises any fasteners and/or devices suitable for operatively connecting the components of wheel assembly 330 together and to frame 301.

Additionally, according to some embodiments, kit 300 further comprises instructions 342 to provide guidance about how to install and/or operate the wheel storage apparatus.

According to some embodiments, kit 300 is configured to provide a compact storage envelope. For example, according to some embodiments, kit 300 is configured for flat-packing, which may minimize shelf-space and to lower transport or storage costs.

Persons skilled in the art will appreciate that there are yet more alternative implementations and modifications possible, and that the above examples are only illustrations of one or more implementations. The scope, therefore, is only to be limited by the claims appended hereto.

It will also be understood that for the purposes of this application, "at least one of X, Y, and Z" or "one or more of X, Y, and Z" language can be construed as X only, Y only, Z only, or any combination of two or more items X, Y, and Z (e.g., XYZ, XYY, XX, YZ, ZZ).

In the present application, components may be described as being "configured to" or "enabled to" perform one or more functions. Generally, it is understood that a component that is configured to or enabled to perform a function is configured to or enabled to perform the function, or is suitable for performing the function, or is adapted to perform the function, or is operable to perform the function, or is otherwise capable of performing the function.

Additionally, components in the present application may be described as being "operatively connected to", "operatively coupled to", and the like, to other components. It is understood that such components are connected or coupled to each other in a manner to perform a certain function. It is also understood that "connections", "coupling" and the like, as recited in the present application include direct and indirect connections between components.

References in the application to "one embodiment", "an embodiment", "an implementation", "a variant", "an aspect", etc., indicate that the embodiment, implementation, aspect or variant described may include a particular aspect, feature, structure, or characteristic, but not every embodiment, implementation or variant necessarily includes that aspect, feature, structure, or characteristic. Moreover, such phrases may, but do not necessarily, refer to the same embodiment referred to in other portions of the specification. Further, when a particular aspect, feature, structure, or characteristic is described in connection with an embodiment, it is within the knowledge of one skilled in the art to affect or connect such module, aspect, feature, structure, or characteristic with other embodiments, whether or not explicitly described. In other words, any module, element or feature may be combined with any other element or feature in different embodiments, unless there is an obvious or inherent incompatibility, or it is specifically excluded.

It is further noted that the claims may be drafted to exclude any optional element. As such, this statement is intended to serve as antecedent basis for the use of exclusive terminology, such as "solely", "only", and the like, in connection with the recitation of claim elements or use of a "negative" limitation. The terms "preferably", "preferred", "prefer", "optionally", "may", and similar terms are used to indicate that an item, condition or step being referred to is an optional (not required) feature of the invention.

The singular forms "a", "an", and "the" include the plural reference unless the context clearly dictates otherwise. The term "and/or" means any one of the items, any combination of the items, or all of the items with which this term is associated. The phrase "one or more" is readily understood by one of skill in the art, particularly when read in context of its usage.

The term "about" can refer to a variation of ±5%, ±10%, ±20%, or ±25% of the value specified. For example, "about 50" percent can in some embodiments carry a variation from 45 to 55 percent. For integer ranges, the term "about" can include one or two integers greater than and/or less than a recited integer at each end of the range. Unless indicated otherwise herein, the term "about" is intended to include values and ranges proximate to the recited range that are equivalent in terms of the functionality of the composition, or the embodiment.

Reference to "generally" can mean "for at least the most part". For example, unless otherwise specified, "generally vertical" could mean the majority of the referenced item is in a vertical position or direction with allowance for at least some variation not necessarily in the vertical direction or position.

As will be understood by one skilled in the art, for any and all purposes, particularly in terms of providing a written description, all ranges recited herein also encompass any and all possible sub-ranges and combinations of sub-ranges thereof, as well as the individual values making up the range, particularly integer values. A recited range includes each specific value, integer, decimal, or identity within the range. Any listed range can be easily recognized as sufficiently describing and enabling the same range being broken down into at least equal halves, thirds, quarters, fifths, or tenths. As a non-limiting example, each range discussed herein can be readily broken down into a lower third, middle third and upper third, etc.

As will also be understood by one skilled in the art, all language such as "up to", "at least", "greater than", "less than", "more than", "or more", and the like, include the number recited and such terms refer to ranges that can be subsequently broken down into sub-ranges as discussed above. In the same manner, all ratios recited herein also include all sub-ratios falling within the broader ratio.

What is claimed is:

1. A wheel storage apparatus comprising:
   a frame having:
      a loading platform having a first end and a second end opposing the first end, the loading platform being generally parallel with and at a loading height from a loading surface and configured to cradle a plurality of wheels about a circumferential portion of each wheel, when the wheel storage apparatus is in a first orientation;
      a wheel supporting platform coupled to the first end of the loading platform, the wheel supporting platform configured to support the plurality of wheels in a stacked configuration when the wheel storage apparatus is in a second orientation;
      a wheel assembly; and
      a handle section coupled to the second end of the loading platform having a handle base shaped and positioned to support the second end of the loading platform when the wheel storage apparatus is in the first orientation;
   wherein:
      the wheel storage apparatus is configured to rotate from the first orientation to the second orientation about a pivot axis proximate the first end of the loading platform;
      the pivot axis is generally aligned with an axle of the wheel assembly; and
      the loading height is the same or less than a height from the loading surface to the axle of the wheel assembly.

2. The apparatus of claim 1, wherein the wheel supporting platform is further configured to help support the loading platform at the loading height when the wheel storage apparatus is in the first orientation.

3. The apparatus of claim 1, wherein the loading platform comprises a pair of struts, the pair of struts being generally elongate and parallel to each other.

4. The apparatus of claim 3, wherein the pair of struts are spaced apart from each other on center at a distance of about 13 to about 20 inches.

5. The apparatus of claim 1, further comprising at least one transverse brace coupled to the loading platform and configured to support the loading platform at the loading height when the wheel storage apparatus is in the first orientation.

6. The apparatus of claim 1, wherein the loading platform is adjustable in at least one direction.

7. The apparatus of claim 6, wherein the loading platform is extensible.

8. The apparatus of claim 6, wherein the loading platform comprises telescoping portions.

9. The apparatus of claim 1, wherein the handle base is P-shaped and the arcuate portion of the P-shape is in contact with the loading surface when in the first orientation.

10. The apparatus of claim 1, wherein the loading height is about 1 inch to about 6 inches.

11. The apparatus of claim 10, wherein the loading height is about 3 inches.

12. The apparatus of claim 1, wherein the wheel supporting platform comprises a secondary support.

13. The apparatus of claim 1, wherein the handle portion is a generally unitary member.

14. The apparatus of claim 1, wherein the handle section comprises a transverse bar.

15. The apparatus of claim 3, wherein the pair of struts are spaced apart from each other on center at a distance of about 13 inches to about 20 inches.

16. A kit for a wheel storage apparatus, the kit comprising:
   a frame comprised of a plurality of separate frame portions configured to be coupled, directly or indirectly, with each other, the frame portions comprising at least one loading platform portion that, when the wheel storage apparatus is assembled and in a first orientation, is at a loading height from a loading surface and configured to cradle a plurality of wheels about a circumferential portion of each wheel, at least one wheel supporting platform portion that, when the wheel storage apparatus is assembled, is configured to support the plurality of wheels in a stacked configuration when the wheel storage apparatus is in a second orientation and to support the loading platform when the wheel storage apparatus is in the first orientation;

at least one handle portion including at least one handle base shaped portion that, when the wheel storage apparatus is assembled and in the first orientation, is positioned to support at least an end of the loading platform when the wheel storage apparatus is in the first orientation; and at least one wheel attachment member configured to operatively couple the wheel assembly to the frame, wherein, when the wheel storage apparatus is assembled and in the first orientation, the loading height is the same or less than a height from the loading surface to an axle of the wheel assembly.

17. The kit of claim 16, wherein the at least one wheel supporting platform portion is configured to couple to a first end of the at least one loading platform portion and the at least one handle portion is configured to couple to a second end of the loading platform, the second end opposite the first end.

18. The kit of claim 16, wherein the at least one loading platform portion, the at least one wheel supporting platform portion and the at least one handle portion are each comprised of a plurality of interconnectable tubular sections.

* * * * *